(12) United States Patent
Lintz

(10) Patent No.: US 12,108,093 B2
(45) Date of Patent: Oct. 1, 2024

(54) METHODS AND SYSTEMS FOR MATCHING INTERESTS WITH CONTENT

(71) Applicant: Comcast Cable Communications, LLC., Philadelphia, PA (US)

(72) Inventor: Christopher Lintz, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/154,409

(22) Filed: May 13, 2016

(65) Prior Publication Data

US 2017/0329762 A1 Nov. 16, 2017

(51) Int. Cl.
| | |
|---|---|
| *H04N 21/00* | (2011.01) |
| *G06F 40/279* | (2020.01) |
| *H04N 21/233* | (2011.01) |
| *H04N 21/2747* | (2011.01) |
| *H04N 21/433* | (2011.01) |
| *H04N 21/466* | (2011.01) |
| *H04N 21/81* | (2011.01) |
| *G06F 40/30* | (2020.01) |

(52) U.S. Cl.
CPC ......... *H04N 21/233* (2013.01); *G06F 40/279* (2020.01); *H04N 21/2747* (2013.01); *H04N 21/4334* (2013.01); *H04N 21/4668* (2013.01); *H04N 21/8133* (2013.01); *G06F 40/30* (2020.01)

(58) Field of Classification Search
CPC .... G06F 17/2785; G06F 17/274; G06F 40/30; G06F 40/284; G06F 40/279; G06F 40/211; H04N 21/233; H04N 21/2747; H04N 21/8133; H04N 21/4668; H04N 21/4334

See application file for complete search history.

(56) References Cited

U.S. PATENT DOCUMENTS

| | | | |
|---|---|---|---|
| 6,061,056 A | 5/2000 | Menard et al. | |
| 6,901,207 B1 | 5/2005 | Watkins | |
| 7,712,117 B1 | 5/2010 | Mohr | |
| 8,736,761 B2 | 5/2014 | Kendall et al. | |
| 9,621,613 B1 | 4/2017 | Huang et al. | |
| 9,881,084 B1* | 1/2018 | Robertson | G06F 16/78 |
| 2003/0088687 A1* | 5/2003 | Begeja | H04N 7/17318 709/231 |
| 2003/0093790 A1 | 5/2003 | Logan et al. | |
| 2003/0149727 A1 | 8/2003 | Jaschek et al. | |
| 2007/0112837 A1* | 5/2007 | Houh | G06F 16/78 707/E17.02 |
| 2010/0023506 A1* | 1/2010 | Sahni | G06F 17/30867 707/E17.014 |
| 2010/0162313 A1 | 6/2010 | Ruiz-Velasco et al. | |
| 2011/0149153 A1 | 6/2011 | Nam et al. | |
| 2013/0325869 A1* | 12/2013 | Reiley | G06F 16/437 707/741 |
| 2013/0326406 A1* | 12/2013 | Reiley | G06F 3/048 707/723 |

(Continued)

*Primary Examiner* — Vu B Hang

(74) *Attorney, Agent, or Firm* — Ballard Spahr LLP

(57) ABSTRACT

Methods and systems are described for storing content that match topics of interest selected by a user or an automated process. Audio information associated with the content can be extracted, parsed, and grouped into topics. Incoming content with audio information that matches the topics of interest selected can be stored and made available to the user for later playback.

21 Claims, 7 Drawing Sheets

(56) References Cited

U.S. PATENT DOCUMENTS

| | | |
|---|---|---|
| 2014/0074866 A1* | 3/2014 | Shah ................ G06F 17/30817 707/749 |
| 2014/0161417 A1 | 6/2014 | Kurupacheril et al. |
| 2015/0095366 A1 | 4/2015 | Mo et al. |
| 2015/0113013 A1 | 4/2015 | Rys et al. |
| 2016/0014482 A1 | 1/2016 | Chen et al. |
| 2016/0149956 A1 | 5/2016 | Birnbaum et al. |
| 2020/0053409 A1 | 2/2020 | Abed |

* cited by examiner

METHODS AND SYSTEMS FOR MATCHING INTERESTS WITH CONTENT

BACKGROUND

Users that are consuming (e.g., viewing, selecting, playing) content have many options of content to choose from for consumption. For example, there are many channels with a wide variety of programming available. At times, the options can be overwhelming and users can miss content of interest. Improved systems and methods for matching user interests with content and enabling users to access the matched content are addressed by the present disclosure.

SUMMARY

It is to be understood that both the following general description and the following detailed description are exemplary and explanatory only and are not restrictive. Methods and systems are described for storing (e.g., recording, copying), identifying, and/or otherwise enabling access to content (e.g., linear, live, on-demand, stored, recorded) that matches topics of interest selected by a user or selected by an automated process. Audio information associated with the content can be extracted, parsed, and grouped into topics. Content that matches topics of interest may be determined, identified, and stored. The content may be determined based on audio information that matches the topics of interest. For example, content that matches the topic of interest can be stored, recorded, identified, and/or the like for subsequent access by the user.

Additional advantages will be set forth in part in the description which follows or may be learned by practice. The advantages will be realized and attained by the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
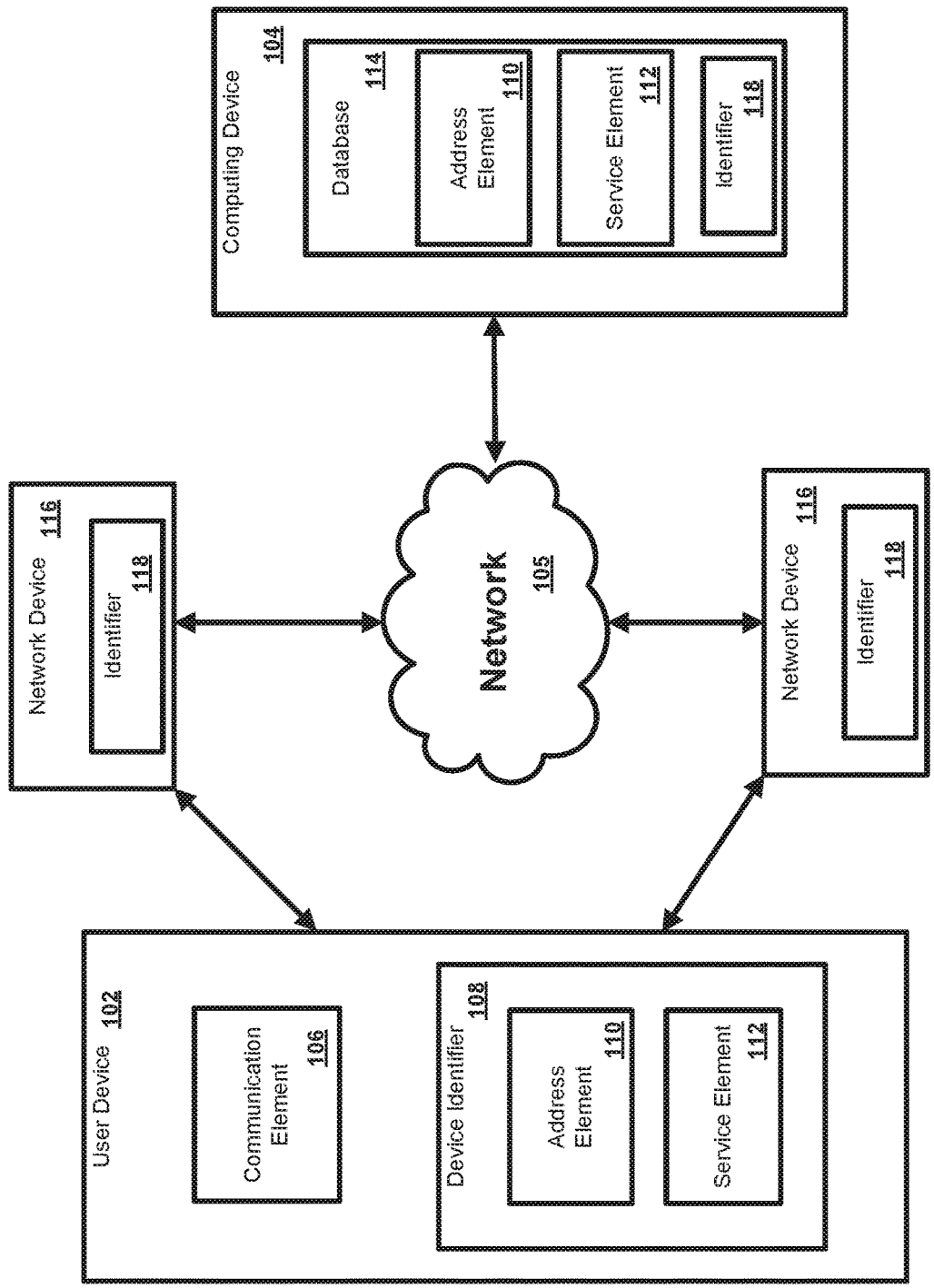
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to improving a content viewing experience for a user. A user can specify topics of interest. A topic of interest can relate to a type of content that a user would like to consume (e.g., actors, genres, directors, styles, etc.). For example, a user can indicate that a college football team is a topic of interest for the user. Alternatively, or in addition, the topics of interest can be specified automatically based on an analysis of the user's viewing habits. For example, an actor can be determined as a topic of interest based on user information, such as viewing history (e.g., a user viewing multiple programs featuring the actor), user preferences (e.g., likes, dislikes), and/or the like.

Content transmitted to the user (e.g., via a set-top box or other computing device) can comprise a variety of types of data, such as audio, video, text, metadata, and/or the like. The content can comprise a plurality of fragments. The content can comprise a file container, such as transport container (e.g., MPEG transport container). The content can comprise a signal. The content can be sent as one or more transmissions (e.g., streams, channels, feeds, etc.). The content can comprise video and audio information (e.g., an audio track, closed caption information, etc.). For example, content associated with a sports channel can comprise a sports show comprising video, an audio track, and closed caption information. Audio information (e.g., the audio information, the closed caption information, combinations thereof, and/or the like) can be extracted for analysis. For example, the audio information can be extracted and analyzed at the set-top box or at a computing device upstream of the set-top box, such as an audio processor. Moreover, extraction and analysis functions can be performed by the same device or by different devices. The audio information can be parsed and topics relevant to the audio information, referred to as "parsed topics" can be determined. Parsing audio information can comprise extracting the audio information into intelligible units (e.g., sentences) using natural language processing (NLP), pauses in speech, punctuation in associated closed caption information, combinations thereof, and/or the like. The intelligible units can be further segmented into words or phrases. Parsed topics can be determined by matching a segmented word or phrase to a predefined topic (e.g., from a data store, defined by a user). The parsed topics can be treated as descriptors for the content associated with the audio information. The segmented word or phrase can be the same as or similar to a known topic. For example, if the segmented phrase is "Denver Broncos" and a predefined topic is "Denver Broncos," then a match can occur and the content can be determined to be associated with the topic: "Denver Broncos." The segmented words or phrases can be used to infer a match with a predefined topic. For example, if the audio information for a particular show contains words or phrases such as "Peyton Manning," "football," and "Super Bowl," then it can be inferred that the show relates to "Denver Broncos."

The parsed topics can be matched with the topics of interest. Parsed topics can be the same as the topics of interest. For example, if a topic of interest for a user is "Denver Broncos" and parsed topic for a show is "Denver Broncos," then a match can be made for the user. Relational information (e.g., stored in a associative, hierarchical, or ontological data store) associating topics with words, topics, abbreviations, spelling variations, and/or the like can be used to match a parsed topic with a topic of interest. For example, if a topic of interest is "NFL" and a parsed topic for a show is "Denver Broncos," the relational information can be used to determine that the Denver Broncos are part of the NFL and a match can be made for the user.

A portion of the content comprising the parsed topic can be stored (e.g., recorded) based on a match between the parsed topic and the topics of interest. The content can be buffered for a predetermined time. A parsed topic can be matched to a topic of interest at a first time relative to the content. A determination can be made to store content. The stored content can comprise a first portion of content and a second portion of content. The first portion of content can occur before the first time, and the second portion of content can occur after the first time. The first portion of the content and/or the second portion of the content can comprise content associated with parsed topic, a scene in which the parsed topic occurs, and/or the like. The first portion of the content and the second portion of the content can together or separately comprise a scene of the content relevant to the parsed topic that matches the topic of interest. All or a portion of the buffer can be stored (e.g., copied to a more permanent storage) as part of stored content. All or a portion of the buffer can be used to determine and store information (e.g., time codes, fragment identifiers) to enable subsequent access to stored content. The stored information can comprise information that can later be used to retrieve the stored content, generate (e.g., using encoding, fragmenting techniques) the relevant portion of the content, and/or the like.

The first portion of the content and/or the second portion of the content can be determined based on one or more predetermined times. For example, the stored content can end at a predetermined time (e.g., 1 minute, 5 minutes, 10 minutes, 1 second, 5 seconds, 10 seconds, or any appropriate time) after the parsed topic occurs in the content. The stored content can end at a predetermined time after determining a match of the parsed topic and the topic. Each time a topic of interest is matched to a parsed topic, an end time of the content (e.g., end time for the recording) can be reset to the predetermined time. For example, each time a college football team indicated to be a topic of interest is determined in parsing topics in the content, the recording can continue for the predetermined time after the college football team was determined. The stored content can end at a scheduled programming end time. For example, a marking of a new program boundary point or scheduling data can be used to determine the end of the stored content (e.g., determine an end point for recording). The stored content can be made available to the user for playback. For example, the stored segment of the sports show can be made available for playback by the user.

The methods and systems described herein relate generally to analysis (e.g., real-time analysis) of content to match portions of content with topics of interest. Example analysis can comprise determining keywords and/or topics from closed captioning data or other data indicative of dialogue or speech within the content. Portions of the content matching topics of interest can be stored (e.g., or information for retrieving the content) for later access by a user. While the content is being analyzed and/or consumed, the content can be stored in a buffer. If a topic of interest relates to a portion of content stored in the buffer, the portion of the content and/or other relevant information (e.g., time codes, fragment identifiers) can be retrieved from the buffer and stored for later access by the user.

FIG. 1 illustrates various aspects of an exemplary environment in which the present methods and systems can operate. One skilled in the art will appreciate that disclosed herein is a functional description and that the respective functions can be performed by software, hardware, or a combination of software and hardware. The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example. The user device 102 can receive topics of interest from a user and transmit the topics of interest to the computing device 104.

The user device 102 can be an electronic device such as a computer, a smartphone, a laptop, a tablet, a set top box, a display device, or other device capable of communicating with the computing device 104. As an example, the user device 102 can comprise a communication element 106 for presenting an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to send communication between the user and one or more of the user device 102 and the computing device 104. As an example, the communication element 106 can request or query various files from a local source and/or a remote source. As a further example, the communication element 106 can transmit data to a local or remote device such as the computing device 104.

The user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108. The computing device 104 can use the device identifier 108 to match a topic of interest and/or content (e.g., a recorded transmission) with the user device 102.

The device identifier 108 can comprise an address element 110 and a service element 112. The address element 110 can comprise or send an internet protocol address, a network address, a media access control (MAC) address, an Internet address, or the like. As an example, the address element 110 can be relied upon to establish a communication session between the user device 102 and the computing device 104 or other devices and/or networks. The address element 110 can be used to establish a communication session to transmit a topic of interest from the user device 102 to the computing device 104. The address element 110 can be used to establish a communication session to transmit content (e.g., a recorded transmission) from the computing device 104 to the user device 102. As a further example, the address element 110 can be used as an identifier or locator of the user device 102. The address element 110 can be persistent for a particular network.

The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. The service element 112 can enable content (e.g., a recorded transmission) to transmitted from the computing device 104 to the user device 102. As a further example, the service element 112 can comprise information relating to a preferred service provider for one or more particular services relating to the user device 102. The address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

The computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. The computing device 104 can allow the user device 102 to interact with remote resources such as data, devices, and files. As an example, the computing device can be configured as (or disposed at) a central location e.g., a headend, or processing facility), which can receive content (e.g., data, input programming) from multiple sources. The computing device 104 can combine the content from the multiple sources and can distribute the content to user (e.g., subscriber) locations via a distribution system. The computing device 104 can transmit linear content to user device 102. The linear content can comprise one or more transmissions (e.g., content streams, file transmissions). The computing device 104 can buffer the content. The computing device 104 can extract audio information from content. The computing device 104 can parse the extracted audio information. The computing device 104 can group the parsed audio information into one or more topics.

The computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. The database 114 can store information relating to the user device 102 such as the address element 110, the service element 112, and/or the topics of interest received from the user device 102. The computing device 104 can match the grouped one or more topics with the topics of interest stored in the database 114. As an example, the computing device 104 can obtain the device identifier 108 from the user device 102 and retrieve information from the database 114 such as the address element 110 and/or the service elements 112, As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

One or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). One or more network devices 116 can be configured to allow one or more wireless devices to connect to a wired and/or wireless network using Wi-Fi, Bluetooth or any desired method or standard.

The network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

One or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. Each of the network devices 116 can comprise a distinct identifier 118. As an example, the identifiers 118 can be associated with a physical location of the network devices 116. The computing device 104 can store the content (e.g., record the transmissions) that comprises matched topics and provide the stored content to the user device 102 via the network 105 and the one or more network devices 116.

Figure 2:
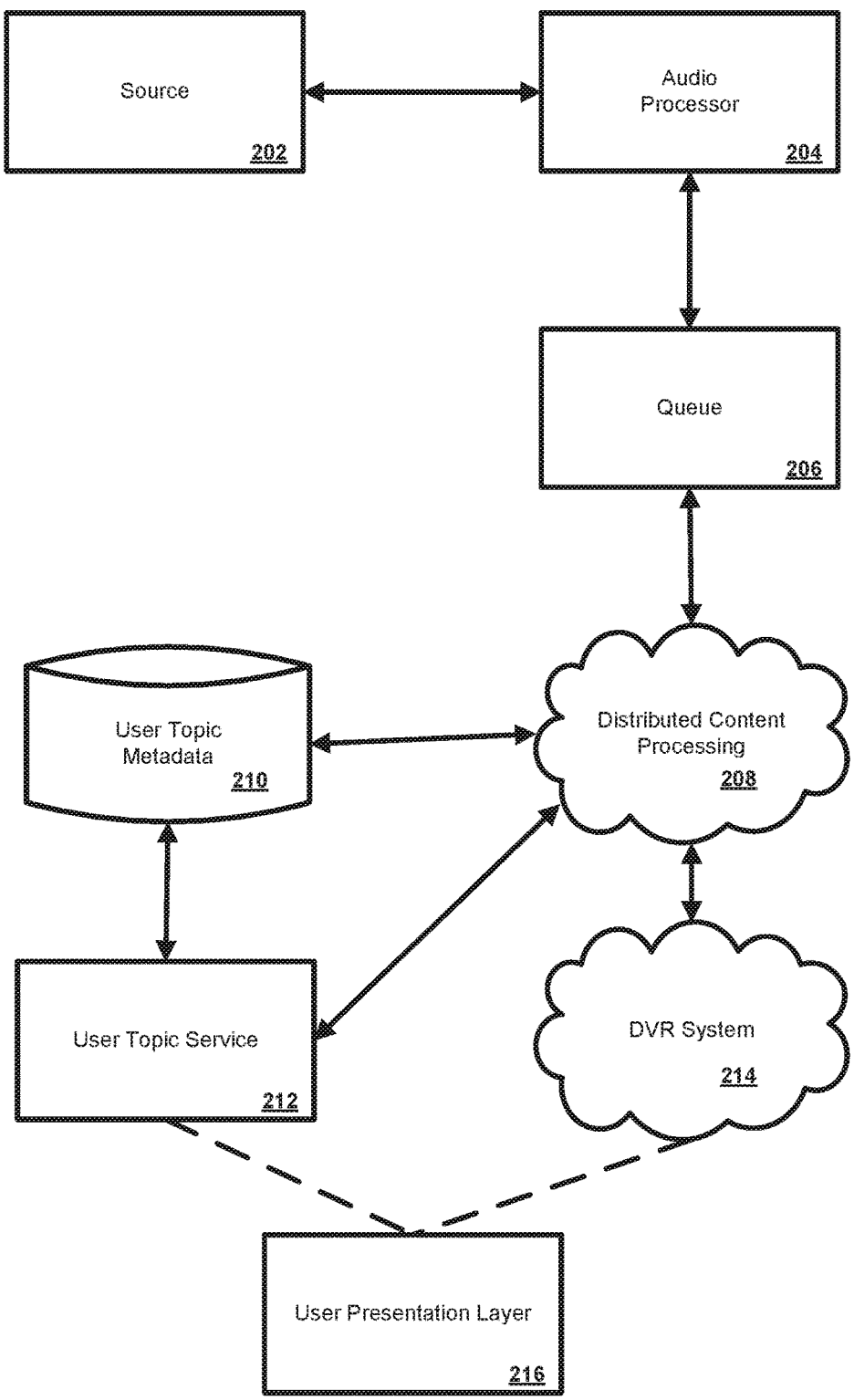
FIG. 2 is a block diagram of an exemplary system and network.

FIG. 2 illustrates various aspects of an exemplary environment in which the present methods and systems can operate. A source 202 can send (e.g., transmit, make available, communicate, etc.) content, such as one or more transmissions of linear content. The source 202 can be a linear packager, a transcoder, an instant video on demand (iVOD) server, combinations thereof, and/or the like. The source 202 can produce a manifest file for each transmission of content, encrypt video files, and/or serve video files as transmissions of content. An audio processor 204 can monitor each manifest tile. The audio processor 204 can extract (e.g., strip, separate, pull, etc.) audio information, such as closed captioning text, from video files pointed to by the manifest files, in response to changes in the monitored manifest files. The audio processor 204 can extract an audio track and convert the audio track to text using speech recognition programs, such as a speech-to-text program. The audio processor 204 can attempt to correct grammar and language mistakes in the extracted text using a lexical-item dictionary, grammar tree program, syntax tree program, parse tree program, combinations thereof, and/or the like. The audio processor 204 can transmit the extracted audio information (e.g., closed caption text, text converted from the audio track, etc. and metadata to a queue 206. The queue 206 can be a single queue or a distributed queue. The queue 206 can comprise closed caption text and metadata from a transmission or a buffered transmission, such as instant Video On Demand (iVOD). The extracted audio information and metadata in the queue 206 can be processed by a distributed content processing system 208. The distributed content processing system 208 is explained in detail in reference to FIG. 3 below.

A user presentation layer 216 can be in communication with a Digital Video Recorder (DVR) system 214 and a user topic service 212. A user can use the systems and methods described herein through the user presentation layer 216. The user presentation layer 216 can be displayed on a user device. The user presentation layer 216 can receive input from the user and display output to the user. The user presentation layer 216 can accept user-defined topics of interest from user input. The user presentation layer 216 can present default topics to the user and receive a selection of one or more of the default topics. A default topic can be a topic provided by a service provider. The user presentation layer 216 can present suggested topics to the user and receive a selection of one or more of the suggested topics. A suggested topic for a user can be a topic determined to be of interest to users with similar viewing patterns of the user. The user topic service 212 can receive topics. Topics can be received through a number of methods, including text input, voice input, a machine learning algorithm (for example, received topics can be based on viewing patterns of the user), etc. The user topic service 212 can generate natural language permutations of the received topics to form a superset for the received topics. The user topic service 212 can include editorialized topic relationships to form a superset of the received topics. The user topic service 212 can filter topics and disallow a user-generated topic. The user topic service 212 can generate common or trending topics, which can be presented by the user presentation layer 216. A common topic can be a topic selected by many users. A trending topic can be a topic selected by many users within a recent time frame. The superset can be transmitted to the distributed content processing system 208. The superset can be transmitted to a user topic metadata database 210. Users can be associated with topics within the user topic metadata database 210. Users can be associated with other users with similar topic interests. For example, if a first user has common interests with second user, if the second user indicates an interest in a topic then the topic can be suggested to the first user. In another example, if many users are suddenly interested in a topic, the topic can be suggested to a user. The distributed content processing system 208 can access the superset via the user topic metadata database 210.

As will be explained in further detail in reference to FIG. 3 below, the distributed content processing system 208 can use the extracted audio information and metadata in the queue 206 and topics within the user topic metadata database 210 to match content (e.g., on a linear transmission or a buffered linear transmission) with a user. The DVR system 214 can record matched content and send the recorded content to the user.

Figure 3:
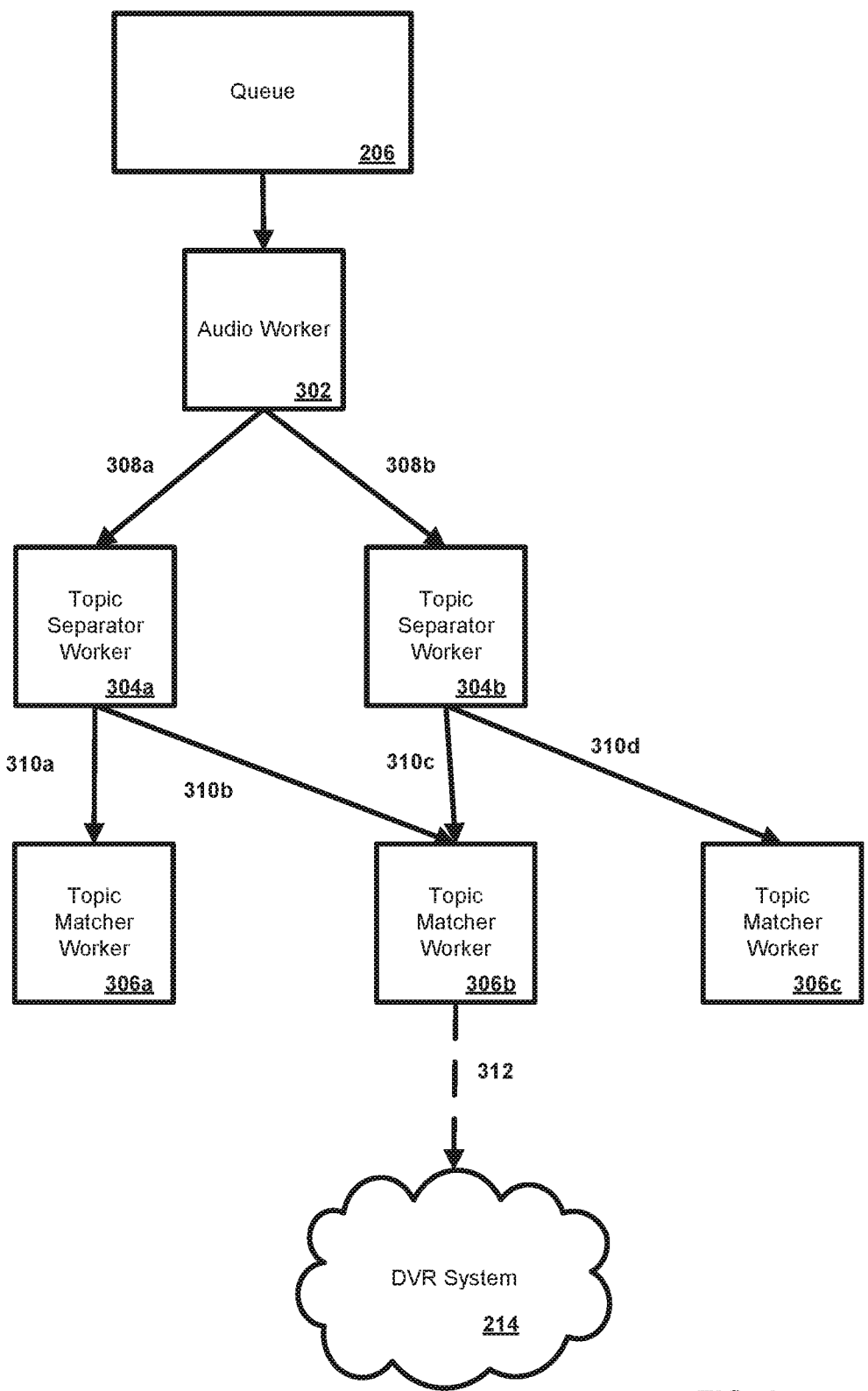
FIG. 3 is a block diagram of an exemplary system and network.

FIG. 3 illustrates various aspects of the distributed content processing system 208 in which the present methods and systems can operate. An audio worker 302 (e.g., module, server, computing device, etc.) can receive (e.g., pull, store, buffer, etc.) extracted audio information from the queue 206. The audio worker 302 can segment (e.g., divide, parse, etc.) the extracted audio information into intelligible units, such as sentences, using natural language processing (NLP), pauses in speech, punctuation in associated closed caption information, combinations thereof, and/or the like. The audio worker 302 can send (e.g., make available, transmit, provide, etc.) segmented audio information 308a, 308b to one or more topic separator workers 304a, 304b (e.g., modules, servers, computing devices, etc.). The one or more topic separator workers 304a, 304b can apply NLP to the segmented audio to determine one or more topics of the segmented audio and forward (e.g., transmit, send, etc.) the one or more determined topics of the segmented audio and associated metadata accordingly. The audio worker 302 can associate a linear transmission identifier of a linear transmission, audio information (e.g., an audio track, closed caption text) of the linear transmission, and an offset representing a time within corresponding content in the linear transmission and send the associated information to the one or more topic separator workers 304a, 304b. The audio worker 302 can segment the extracted audio information into multiple intelligible units. For example, the audio worker 302 can receive extracted audio information that comprises multiple intelligible units relating to a sports show from the queue 206 and the audio worker 302 can segment a sentence "Peyton Manning returns to the Denver Broncos" (segmented sentence 308a) from a CHANNEL transmission and transmit the segmented sentence 308a and associated information to a first topic separator worker 304a. The audio worker 302 can segment the sentence "Robert Rodriguez arrives in Denver, Colorado" (segmented sentence 308b) from a CHANNEL 2 transmission and transmit the segmented sentence 308b and associated information to a second topic separator worker 304b. The audio worker 302 can segment audio information from the queue 206 and deliver the segmented audio information to the one or more topic separator workers 304a, 304b according to any algorithm (e.g., hash, round robin, random, etc.).

The one or more topic separator workers 304a, 304b can parse (break down, analysis, etc.) the segmented audio information received from the audio worker 302 to hash (e.g., assign, allocate, designate, attribute, etc.) the segmented audio information to one or more topics. The one or more topic separator workers 304a, 304b can apply editorialized topic matching to the segmented audio information. Editorialized topic matching can comprise a list of words or phrases that can hash to a topic. For example, the phrase "you're tired" can appear on an editorialized topic list for "Presidential Race 2016." The list of words or phrases can be manually entered by a content provider or a third party. The one or more topic separator workers 304a, 304b can apply natural language processing (NLP) to the parsed segments to determine an appropriate topic hash. For example, a segment comprising "NFL" and "Broncos" can be hashed to "Denver Broncos." The one or more topic separator workers 304a, 304b can transmit associated information 310a, 310b, 310c, 310d to one or more topic matcher workers 306a, 306b, 306c (e.g., modules, servers, computing devices, etc.) associated with (e.g., corresponding to, indicative of, etc.) the hashed topic.

The one or more topic matcher workers 306a, 306b, 306c can match users in the user topic metadata database 210 with the hashed topic. The one or more topic matcher workers 306a, 306b, 306c can use the associated information to identify content in content (e.g., linear content) and a time offset. The one or more topic matcher workers 306a, 306b, 306c can cause a recording device associated with a matched user to record (e.g., store) the content at the time offset. Hashing can ensure that the same stream is not recorded multiple times for the same topic. If two different topics cause the same stream to be recorded for the same user, then two separate recordings of the same stream can be made and sent to the user, each associated with one of the topics. If a user is matched a topic, the one or more topic matcher workers 306a, 306b, 306c can access the user topic service 212 to determine if the user is already storing content (e.g., recording a linear transmission) associated with the associated information. If different topics cause the same stream to be recorded for a user, then one recording of the stream can be made and sent to the user. A user can specify a preference of how the system should handle overlapping matched topics within a single stream. For example, the topic separator worker 304a with the "Peyton Manning returns to the Denver Broncos" sentence can transmit the associated information 310a corresponding to "Peyton Manning" to the topic matcher worker 306a used (e.g., dedicated, associated, reserved, etc.) for processing the topic of "Peyton Manning" and transmit the associated information 310b corresponding to Denver and "Denver Broncos" to the topic matcher worker 306b used for processing the topic of "Denver". In another example, the topic separator worker 304b with the "Robert Rodriguez arrives in Denver, Colorado" sentence can transmit the associated information 310c corresponding to Denver and "Denver, Colorado" to the topic matcher worker 306b used for processing the topic of "Denver" and the associated information 310d corresponding to "Robert Rodriguez" to the topic matcher worker 306c used for processing the topic of "Robert Rodriguez". The one or more topic matcher workers 306a, 306b, 306c can match the topics represented by the transmitted associated information 310a, 310b, 310c, 310d to users interested in the topics. The one or more topic matcher workers 306a, 306b, 306c can transmit instructions 312 to cause a DVR system 214 to record (e.g., store) content corresponding to the associated information 310a, 310b, 310c, 310d. The DVR system 214 can be a local DVR to the user. The DVR system 214 can be a cloud system, wherein a DVR is remote to the user and the recorded content is accessible by the user. For example, the DVR system 214 can transmit instructions 312 to the DVR system 214 to cause the DVR system 214 to record CHANNEL 1 and CHANNEL 2 for a user interested in the topic of "Denver" The one or more topic matcher workers 306a, 306b, 306c can produce an output. The output can be in the format of an input for another device. For example, the output can be in the format of an input for a local DVR system. In another example, the output can be in the format of an input for a cloud DVR system. The audio worker 302, the one or more topic separator workers 304a, 304b, and the one or more topic matcher workers 306a, 306b, 306c can reside in a single computing device. The audio worker 302, the one or more topic separator workers 304a, 304b, and the one or more topic matcher workers 306a, 306b, 306c can reside in multiple computing devices.

Figure 4:
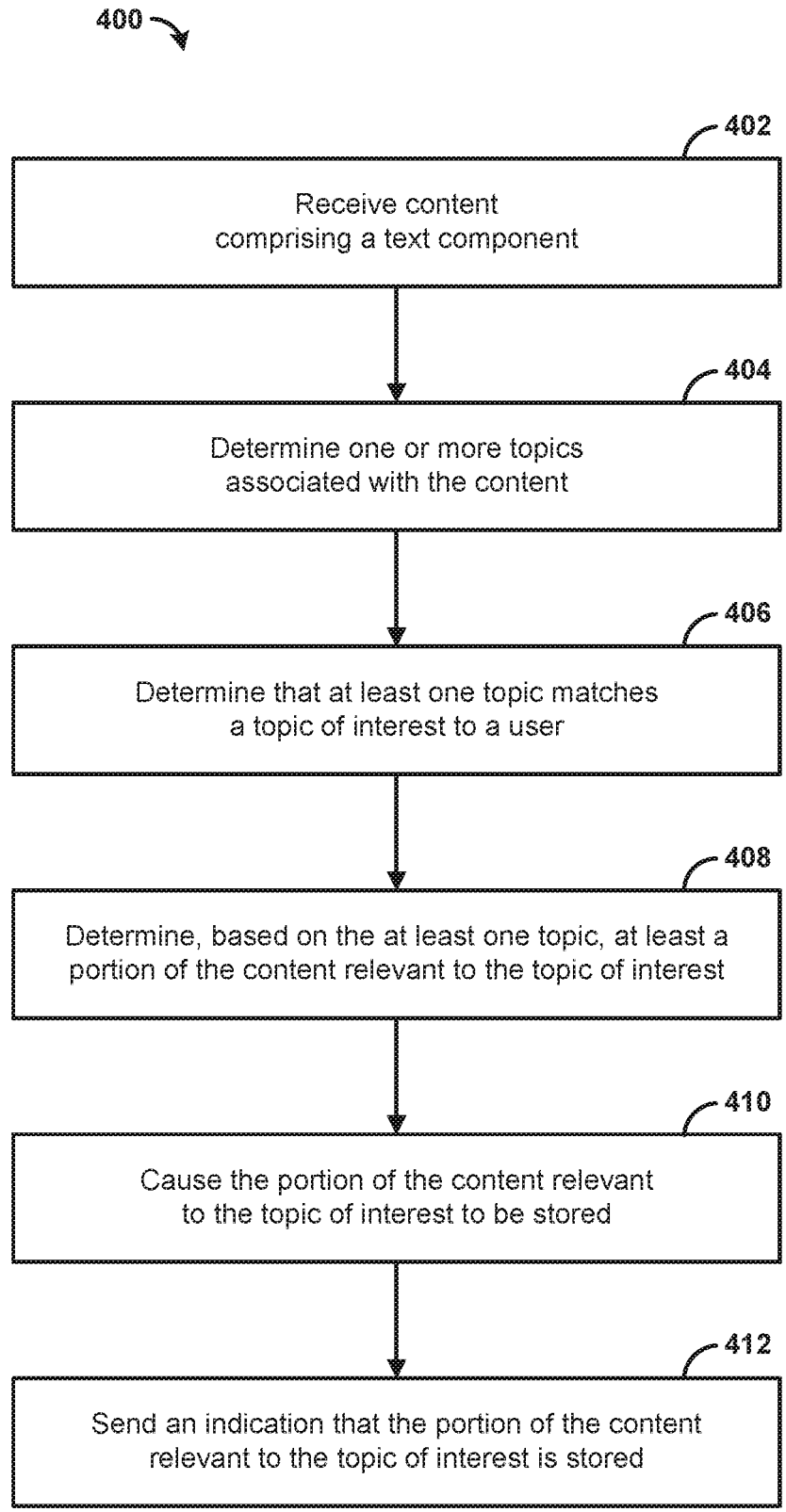
FIG. 4 is a flow chart of an exemplary method.

FIG. 4 illustrates an exemplary method 400, executed by, for example, the distributed transmission processing system 208. At step 402, content comprising a text component can be received. The content can comprise linear content. The content can comprise a content stream associated with a linear content channel. The linear content channel can comprise a television channel. The text component can be, for example, closed captions (e.g., closed caption data). The content can comprise an audio component. The audio component can be, for example, an audio track. The text component can correspond to the audio component. The text component can comprise text converted from the audio component.

In an aspect, the method 400 can comprise receiving input from the user device, A topic of interest to a user can be determined based on the input, Determining the topic of interest based on the input can comprise suggesting the topic of interest based on the input and user information. A selection of the topic of interest can be received from the user device. Input can be received from a user and converted into one or more user topics of interest. The one or more topics of interest can be associated with the user. Converting the input into one or more topics of interest can comprise generating natural language permutations of the input. For example, the following inputs "presidential," "president," and "presidents" can be converted into the topic of "Presidential Race 2016." Converting the input into one or more topics of interest can comprise generating editorialized permutations of the input. Editorialized topic matching can comprise a list of words or phrases that can hash to a topic. For example, the phrase "you're fired" can appear on an editorialized topic list for "Presidential race 2016." The list of words or phrases can be manually entered by a content provider or a third party.

At step 404, one or more topics associated with the content can be determined. The one or more topics can be determined based on parsing the text component. For example, the closed captions can be parsed. Parsing can comprise segmenting the text component into intelligible units (e.g., sentences, phrases). The intelligible units (e.g., sentences, phrases) can be parsed to determine topics. The determined topic can be converted into a superset of natural language permutations of the topic. Parsing the text component can comprise discarding certain words as noise. For example, conjunctions and articles can rarely be useful as topics and can be discarded. Parsing the text component can comprise identifying likely topics. For example, proper nouns can frequently be useful as topics and can be identified as likely topics.

At step 406, it can be determined that at least one topic matches a topic of interest to a user. The one or more topics associated with the content can be matched and/or compared to the topic of interest. One or more of the permutations in the superset of natural language permutations of the topic can be matched.

At step 408, at least a portion of the content relevant to the topic of interest can be determined. The portion of the content relevant to the topic of interest can be determined based on the at least one topic. A portion of the text component relevant to the matched topic can be associated with a time range of the content. Determining at least the portion of the content relevant to the topic of interest can comprise determining the portion of the content based on an association of the at least one topic with the time range. For example, closed caption data can comprise timing information (e.g., time codes) for correlating closed captions with corresponding content (e.g., audio and video content). When the topic is parsed from the content, the timing information can be stored and/or associated with the parsed topic. In an aspect, the method 400 can comprise determining a first time in the stored content associated with the matched topic. Determining at least the portion of the content relevant to the topic of interest can be based on the first time. The content (e.g., or closed caption data) can be analyzed to determine a scene associated with the content. The beginning and end of the portion of the content can be determined based on the time boundaries of the scene.

At step 410, the portion of the content relevant to the topic of interest can be caused to be stored. In some implementations, content data can be stored. The content data can comprise information (e.g., time codes, segment identifiers) for generating the portion of the content (e.g., in response to a later request from the user). The information can comprise a start time and an end time of the portion of the content. The information can be used to request storage and/or playback of only the portion of the content (e.g., regardless of whether a recording is used, copy of the portion is used. For example, the information can be used to allow limited access (e.g., access to only the portion of the content) streaming of a content asset. The data transmission can be stored (e.g., recorded, copied) on a device local to the user. The data transmission can be stored by a centrally located device and the user device can be given access to the stored content. In an aspect, the method 400 can comprise buffering the content. Causing the portion of the content relevant to the topic of interest to be stored can comprise causing the buffered content to be stored as part of the portion of the content.

A first time in the content associated with the matched topic can be identified based on a received offset. The stored content have a beginning at a predetermined time prior to the identified time in the content associated with the matched topic. Causing the portion of the content relevant to the topic of interest to be stored can comprise causing the storing of the portion of the content with a start time of the portion of the content being a predetermined time prior to the first time. Causing the portion of the content relevant to the topic of interest to be stored can comprise causing the stored portion of the content to have an end time at a predetermined time after the first time.

The predetermined time can be a time associated with a buffer. The predetermined time can be an earliest time of content in the buffer. For example, the predetermined time can be one minute and the time associated with the buffer can be one minute. The predetermined time can be any time less than the time associated with the buffer. For example, the predetermined time can be two minutes and the time associated with the buffer can be five minutes. The recording can end a predetermined time after the identified time in the content associated with the matched topic. For example, the content (e.g., recording of content) can end five minutes after the identified time. The text component of the content can be monitored for additional matches with the matched topic. The first time in the content associated with the matched topic can be updated each instance of additional references to the matched topic appearing in the content. The stored content have an end time at the predetermined time after the updated first time. For example, a reference to a topic can be made 10 minutes into a program (e.g., television show, movie, sporting event, etc.). Another reference to the topic can be made 14 minutes into the program and again 16 minutes into the program. The stored content (e.g., recording) can begin 9 minutes into the program and end 21 minutes into the program. In another example, the stored content can end at the end of the program.

At step 412, an indication that the portion of the content relevant to the topic of interest is stored can be sent. The indication can be sent to a user device associated with the user. A signal can be transmitted to a user device associated with the user to enable access to the recorded data transmission. The user device can query the DVR system 214 to initiate the transmission of the signal to the user device. The user device can query the user topic service 212 to initiate the transmission of the signal to the user device. The signal can be a notification. The content can be stored on a device local to the user. The content can be stored (e.g., recorded) by a centrally located device and the user device can be given access to the stored content. The stored content can be caused to be available to the user.

Figure 5:
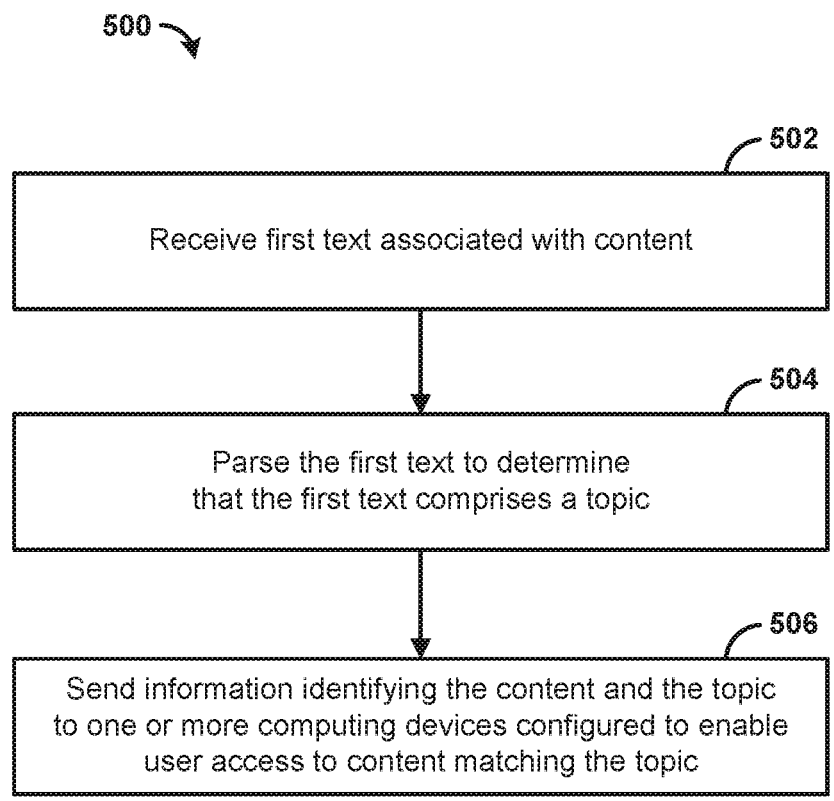
FIG. 5 is a flow chart of an exemplary method.

FIG. 5 illustrates an exemplary method 500, executed by, for example, a topic separator worker 304a, 304b. At step 502, first text can be received. The first text can be associated with content (e.g., content stream, data transmission). The content can comprise a linear content channel. The content can comprise linear content. The data transmission can be buffered. The first text can comprise closed captions. The first text can comprise text converted from an audio track associated with the data transmission. The first text can be received in intelligible units (e.g., sentences, etc.).

At step 504, the first text can be parsed to determine that the first text comprises a topic. The intelligible units can be parsed to determine topics. Parsing the first text can comprise discarding certain words as noise. For example, conjunctions and articles can rarely be useful as topics and can be discarded. Parsing the first text can comprise identifying likely topics. For example, proper nouns can frequently be useful as topics and can be identified as likely topics. The determined topic can be converted into a superset of natural language permutations of the topic.

At step 506, information can be transmitted to one or more computing devices. The information can identify the data transmission. The information can identify the topic. The one or more computing devices can be configured to match the topic with topics determined to be of interest to one or more users. The one or more computing devices can be configured to cause the data transmission to be recorded. The one or more computing devices can be configured to cause the recorded data transmission to be presented to the one or more users.

Optionally, a time in the data transmission associated with the first text can be received. The information can comprise the time. The one or more computing devices can be configured to cause the stored content to begin at a predetermined time prior to the time in the content associated with the first text. The one or more computing devices can be configured to cause the stored content to end at a predetermined time after the time in the content associated with the first text. In another example, the recording can end when a program currently carried by the content ends.

Figure 6:
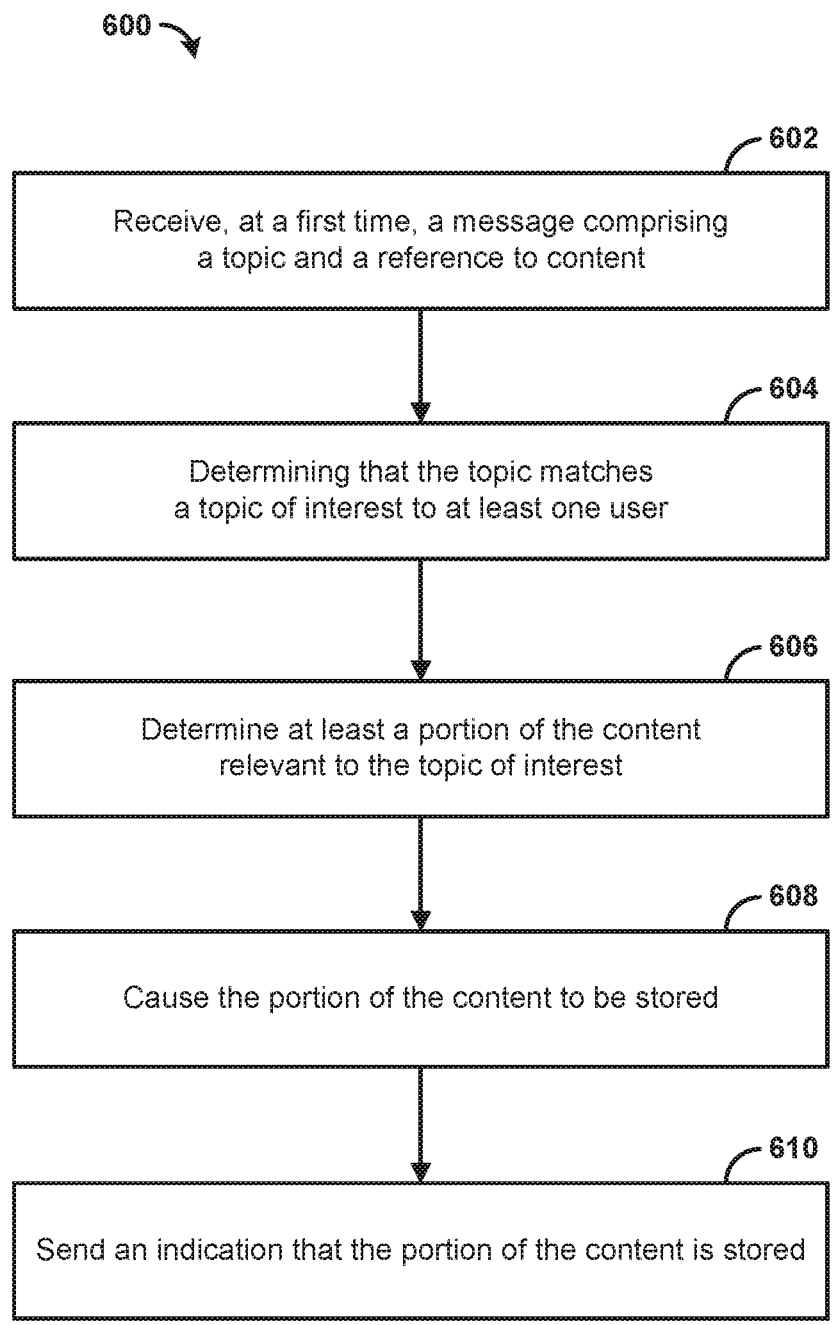
FIG. 6 is a flow chart of an exemplary method.

Optionally, second text can be received. The second text can be parsed to determine the second text comprises the topic. The time can be updated to the time in the content associated with the second text. The updated time can be transmitted to the one or more computing devices. The one or more computing device can be configured to cause the content to be recorded up to a predetermined time after the updated time in the content associated with the second text, FIG. 6 illustrates an exemplary method 600. The method 600 can, for example, be executed by a topic matcher worker 306a, 306b, 306c. At step 602, a message can be received at a first time. The message can comprise a topic. The message can comprise a superset of words associated with the topic. The message can comprise natural language permutations of the topic. The message can comprise a reference to content (e.g., liner content, a content stream, a data transmission). The message can comprise a reference to a television channel. The message can comprise reference to linear content.

At step 604, it can be determined that the topic matches a topic of interest to at least one user. The at least one user can select the topic of interest. The topic of interest can be inferred based on viewing behavior of the user. The topic of interest can be matched to one or more of the superset of words. The topic of interest can be matched to one or more of the natural language permutations.

At step 606, at least a portion of the content relevant to the topic of interest can be determined. For example, the portion of the content can be determined based on the topic matching the topic of interest. The topic matching the topic of interest can be associated with a time range, start time, and/or end time. For example, closed caption data can comprise timing information (e.g., time codes) for correlating closed captions with corresponding content (e.g., audio and video content). When the topic is parsed from the content, the timing information can be stored and/or associated with the parsed topic. The portion of the content can begin at a predetermined time prior to the first time. The portion of the content can end at a predetermined time after to the first time. The determination can be based on the topic matching the topic of interest. In an aspect, the content (e.g., or closed caption data) can be analyzed to determine a scene associated with the content. The beginning and end of the portion of the content can be determined based on the time boundaries of the scene.

At step 608, the content can be caused to be stored (e.g., recorded, copied).

The content can start at a predetermined time prior to the first time. The predetermined time can correspond to a buffer. For example, if the buffer can told one minute of content, then the predetermined time can be one minute. The predetermined time can be any time less than the time associated with the buffer. The stored content can end at a predetermined time (e.g., 1 minute, 5 minutes, 10 minutes, 1 second, 5 seconds, 10 seconds, or any appropriate time) after the parsed topic occurs in the content. The stored content can end at a predetermined time after determining a match of the parsed topic and the topic. Each time a topic of interest is matched to a parsed topic, an end time of the content (e.g., end time for the recording) can be reset to the predetermined time. For example, each time a college football team indicated to be a topic of interest is determined in parsing topics in the content, the stored content can continue for the predetermined time after the college football team was determined. The stored content can end at a scheduled programming end time. For example, a marking of a new program boundary point or scheduling data can be used to determine the end of the stored content (e.g., determine an end point for recording).

At step 608, an indication that the portion of the content is stored can be sent. For example, the indication can be sent to at least one user device associated with the at least one user. A signal can be transmitted to a user device associated with the at least one user to enable access to the stored content (e.g., recorded data transmission). The signal can comprise the notification. The stored content can be caused to be available for presentation to the at least one user. The content can be stored (e.g., recorded, copied) on a device local to the at least one user. The content can be stored remotely to the at least one user, and the user device associated with the at least one user can be given access to the stored content.

Figure 7:
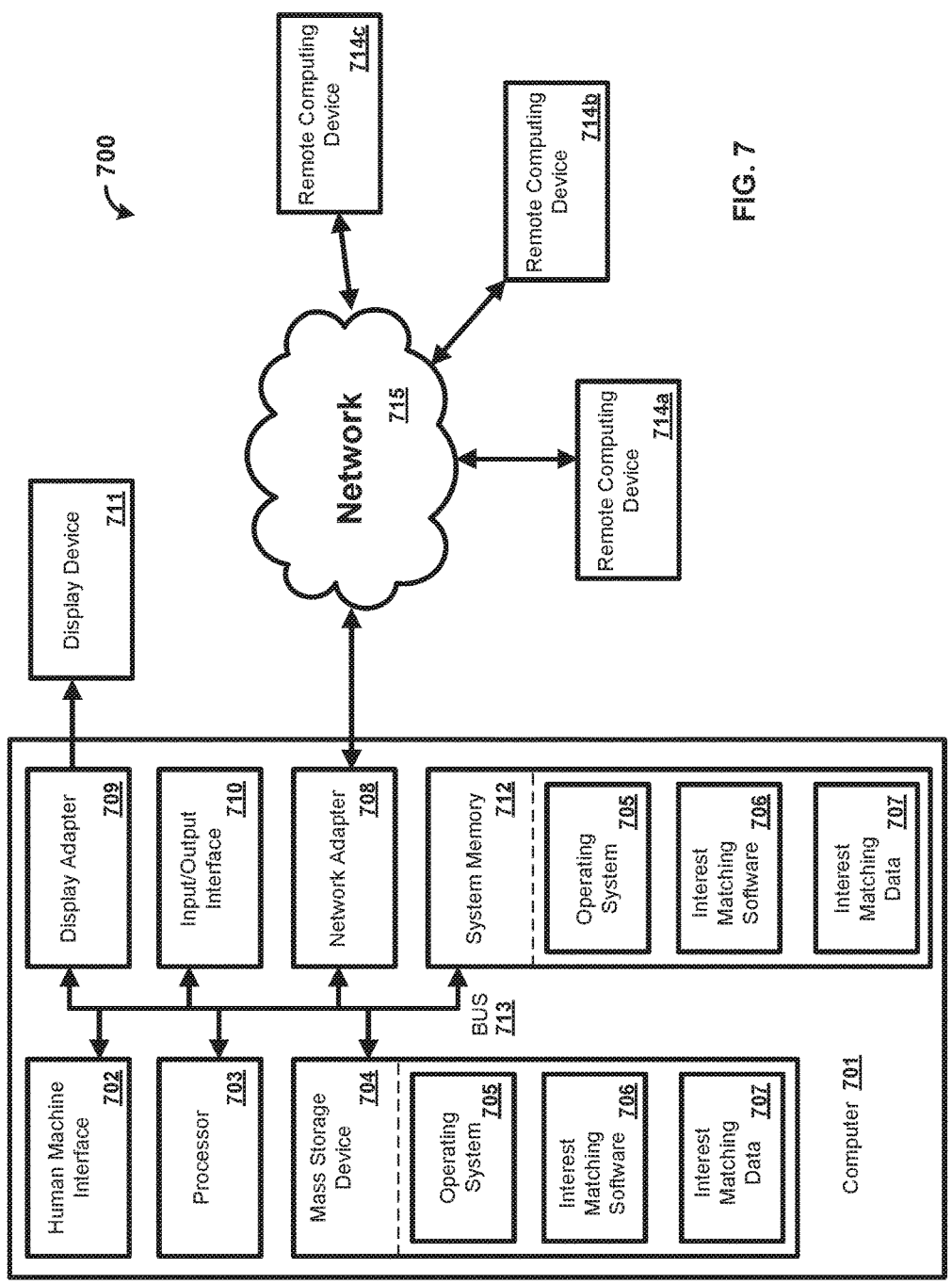
FIG. 7 is a block diagram of an exemplary computing device.

In an exemplary aspect, the methods and systems can be implemented on a computer 701 as illustrated in FIG. 7 and described below. By way of example, user device 102 of FIG. 1 can be a computer 701 as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 713, and all buses specified in this description can also be implemented over a wired or wireless network connection and each of the subsystems, including the one or more processors 703, a mass storage device 704, an operating system 705, interest matching software 706, interest matching data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the interest matching data 707 and/or program modules such as the operating system 705 and the interest matching software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can comprise non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the interest matching software 706. Each of the operating system 705 and the interest matching software 706 (or some combination thereof) can comprise elements of the programming and the interest matching software 706. The interest matching data 707 can also be stored on the mass storage device 704. The interest matching data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown), Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the interest matching software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, at a computing device, a video content comprising a text component;
    determining, based on the text component, one or more topics associated with the video content;
    determining, based on user information, that the one or more topics comprises a topic of interest to a user; and
    based on the determination that the one or more topics comprises the topic of interest to the user:
    determining timing information associated with a portion of the video content corresponding to the topic of interest; and
    causing the timing information associated with the portion of the video content to be stored.

2. The method of claim 1, further comprising buffering the video content.

3. The method of claim 1, further comprising:
    receiving, from a user device, data associated with an input; and
    determining, based on the data associated with the input, the topic of interest.

4. The method of claim 3, wherein determining, based on the input, the topic of interest comprises:
    suggesting, based on the input and information associated with the user, the topic of interest; and
    receiving, from the user device, an indication of a selection of the topic of interest.

5. The method of claim 1, further comprising determining, based on parsing the text component from the video content, a relevant portion of the text component that is relevant to the topic of interest, wherein the relevant portion of the text component is associated with a time range of the video content, wherein determining, based on the topic of interest, the relevant portion of the video content is based on the association between the relevant portion of the text component and the video content associated with the time range.

6. The method of claim 1, further comprising determining a first time associated with the topic of interest, wherein the topic of interest is relevant to the portion of the video content.

7. The method of claim 6, wherein causing the timing information to be stored indicates a predetermined start time of the video content prior to the first time.

8. The method of claim 6, further comprising:
monitoring the text component of the video content for additional references to the topic of interest; and
updating the first time for each instance of the additional references to the topic of interest occurring in the video content.

9. The method of claim 1, further comprising sending, based on the timing information, the portion of the video content.

10. The method of claim 1, wherein the video content comprises a content stream associated with a linear content channel, and wherein causing the timing information associated with the portion of the video content to be stored occurs automatically without user interaction.

11. A system, comprising:
a first computing device configured to:
receive video content comprising a text component; and
determine, based on the text component, one or more topics associated with the video content;
a second computing device configured to:
receive the one or more topics from the first computing device;
determine, based on user information, that the one or more topics comprises a topic of interest to a user; and based on the determination that the one or more topics comprises the topic of interest to the user:
determine timing information associated with a portion of the video content corresponding to the topic of interest; and
send an instruction to store the timing information; and
a storage device configured to:
receive the instruction from the second computing device; and
responsive to receiving the instruction, store the timing information.

12. The system of claim 11, wherein the storage device is further configured to buffer the video content, wherein buffered video content is stored as part of the portion of the video content.

13. The system of claim 11, wherein the first computing device or the second computing device is configured to:
receive, from a user device, data associated with an input; and
determine, based on the data associated with the input, the topic of interest.

14. The system of claim 13, wherein the second computing device is further configured to:
suggest, based on the input and information associated with the user, the topic of interest; and
receive, from the user device, an indication of a selection of the topic of interest.

15. The system of claim 11, wherein the second computing device is further configured to:
determine, based on parsing the text component from the video content, a relevant portion of the text component that is relevant to the topic of interest, wherein the relevant portion of the text component is associated with a time range of the video content; and
determine, based on the topic of interest, the portion of the video content based on the association between the relevant portion of the text component and the video content associated with the time range.

16. The system of claim 11, wherein the second computing device is further configured to determine, based on the topic of interest, the portion of the video content based on a first time.

17. The system of claim 16, wherein the storage device is further configured to indicate a predetermined time of the video content prior to the first time.

18. The system of claim 11, wherein the second computing device is further configured to send, based on the timing information, the portion of the video content.

19. A method comprising:
receiving, at a first time at a computing device, a message comprising a topic and a reference to a video content;
determining, based on the message and based on user information, that the topic matches a topic of interest of a user;
based on the determination that the topic matches the topic of interest to the user:
determining timing information associated with a portion of the video content corresponding to the topic; and
causing the timing information associated with the portion of the video content to be stored.

20. The method of claim 19, wherein causing the timing information associated with the portion of the video content to be stored is indicative of a predetermined start time of the video content prior to the first time.

21. The method of claim 19, further comprising sending, based on the timing information, the portion of the video content.

* * * * *